United States Patent [19]

Sasaki et al.

[11] Patent Number: 5,016,670
[45] Date of Patent: May 21, 1991

[54] FUEL TANK STRUCTURE FOR AUTOMOTIVE VEHICLE

[75] Inventors: Michiaki Sasaki, Hadano; Katsunori Ozaki, Zama, both of Japan

[73] Assignee: Nissan Motor Company, Limited, Yokohama, Japan

[21] Appl. No.: 446,521

[22] Filed: Dec. 7, 1989

[30] Foreign Application Priority Data

Dec. 7, 1988 [JP] Japan .................. 63-307781

[51] Int. Cl.$^5$ .......................................... F02M 37/00
[52] U.S. Cl. .................... 137/574; 137/576; 123/514
[58] Field of Search ............. 137/571, 574, 576; 123/514, 516

[56] References Cited

U.S. PATENT DOCUMENTS

| 4,397,333 | 8/1983 | Liba et al. | 137/574 |
|---|---|---|---|
| 4,503,885 | 3/1985 | Hall | 137/574 |
| 4,669,501 | 6/1987 | Takahashi | 137/576 |
| 4,750,513 | 6/1988 | Griffin et al. | 137/316 |
| 4,750,518 | 6/1988 | Griffin et al. | 137/574 X |
| 4,842,006 | 6/1989 | Scheurenbrand | 137/574 X |
| 4,844,704 | 7/1989 | Jiro | 123/516 X |
| 4,886,031 | 12/1989 | Scheurenbrand et al. | 123/516 |
| 4,899,784 | 2/1990 | Woodgate et al. | 137/574 |

FOREIGN PATENT DOCUMENTS

| 2401728 | 7/1975 | Fed. Rep. of Germany . |
|---|---|---|
| 2602234 | 4/1977 | Fed. Rep. of Germany . |
| 3612194 | 10/1986 | Fed. Rep. of Germany . |
| 3719809 | 6/1988 | Fed. Rep. of Germany . |
| 1515800 | 6/1978 | United Kingdom . |
| 2180595 | 4/1987 | United Kingdom . |

*Primary Examiner*—John Rivell
*Attorney, Agent, or Firm*—Foley & Lardner

[57] ABSTRACT

In a fuel tank structure for an automotive vehicle, a fuel collector unit includes a collector body which is provided with a fuel collecting chamber and a fuel passage. The fuel passage has an inlet adjacent to a bottom wall of a tank body and an outlet opening toward the fuel collecting chamber for conducting fuel in the tank body into the fuel collecting chamber. The fuel passage is arranged such that the fuel below a predetermined vertical level at a certain location in the fuel passage is prevented from flowing out through the inlet. The fuel collector unit further includes an ejector which ejects oversupplied return fuel into the fuel passage through the inlet so as to suck the fuel therearound. The sucked fuel is mixed with the ejected return fuel and introduced into the fuel passage through the inlet.

12 Claims, 8 Drawing Sheets

FUEL TANK STRUCTURE FOR AUTOMOTIVE VEHICLE

BACKGROUND OF THE INVENTION

1. Field of the Invention

The present invention relates to a fuel tank structure for an automotive vehicle. More specifically, the present invention relates to a fuel tank structure having a fuel collector unit provided within a fuel tank body at its bottom, which ensures an effective introduction of the fuel into a fuel collector body of the collector unit by utilizing a jet flow of oversupplied return fuel fed from the fuel supply system, and further ensures a sufficient maximum fuel capacity of the fuel collector body without enlarging size thereof.

2. Description of the Background Art

In general, a fuel collector unit is provided at a bottom of a fuel tank body for storing enough fuel to ensure smooth and effective suction by a fuel feed pump when the fuel is biased toward one direction within the tank body due to the centrifugal force exerted on the fuel when a vehicle turns at a curve in a road, or due to the gravity when the vehicle travels along a slope in the road.

Such a fuel collector unit is disclosed, for example, in Japanese First Utility Model Publication No. 6157034. In this conventional structure, a fuel collector unit includes a fuel collector body which is welded to a bottom of a tank body. The collector body is of a bottomed box shape having no top cover and includes a fuel collecting chamber and a substantially L-shaped fuel passage for conducting the fuel within the tank body into the fuel collecting chamber. The fuel passage has an inlet adjacent to the bottom of the tank body for introducing the fuel into the fuel passage and an outlet adjacent to the fuel collecting chamber for discharging the fuel into the collecting chamber.

In the fuel collecting chamber, a lower end portion of a fuel feed tube of a fuel feed pump is disposed directly or through a strainer. Normally, a fuel return tube is also arranged in the fuel collecting chamber for returning oversupplied fuel from the fuel supply system, as, for example, disclosed in Japanese First Utility Model Publication No. 61-59432.

In case the fuel is biased toward one direction due to, for example, the centrifugal force or the gravity as mentioned above with the fuel within the tank body being relatively small in amount, a maximum fuel capacity of the fuel collector body is generally determined by a vertical position of the inlet of the fuel passage or a vertical position of the outlet of the fuel passage. Specifically, when the vertical position of the inlet or outlet is lower, the maximum fuel capacity becomes smaller, and vice versa. Accordingly, assuming that the vertical position of the inlet or outlet is set higher relative to the tank body bottom, a larger maximum fuel capacity of the collector body is attained so as to ensure the smooth and effective suction of the fuel feed pump when the fuel is biased toward one direction within the tank body.

However, assuming that a fuel level in the tank body becomes below the inlet or outlet of the fuel passage, the fuel cannot be introduced into the fuel passage toward the fuel collecting chamber. Accordingly, when the vertical position of the inlet or outlet of the fuel passage is set higher, an amount of the fuel remaining in the fuel tank becomes larger so that the fuel which is particularly precious and valuable when the remaining fuel is small in amount, can not be used for the vehicle operation, but remained as being non-used. Naturally, this disadvantage should be eliminated.

On the other hand, if a size of the fuel collector body is enlarged, the larger maximum capacity of the fuel collector body is obtained. However, since the fuel collector unit is inserted through a work window provided at an upper wall of the tank body, the size of the fuel collector unit is limited by this requirement. Though it is possible to blow mould the tank body with the fuel collector body therein in case of the tank body being made of synthetic resin, the moulding of this type is very complicated and the insertion of the collector unit through the work window as mentioned above is normally required.

SUMMARY OF THE INVENTION

Therefore, it is an object of the present invention to provide a fuel tank structure for an automotive vehicle having a fuel collector unit therein, wherein a required maximum capacity of a fuel collector body is ensured without enlarging a size of the fuel collector body when a fuel within a tank body is biased toward one direction due to the centrifugal forces or gravity exerted on the fuel.

Another object of the present invention is to provide the above-mentioned fuel tank structure, wherein the fuel within the tank body is effectively introduced into the fuel collector body even when the fuel remained in the tank body is very small in amount, by utilizing a jet flow of oversupplied return fuel from the fuel supply system.

To accomplish the above-mentioned and other objects, according to one aspect of the present invention, in a fuel tank structure for an automotive vehicle, a fuel collector unit comprises a collector body fixed relative to a bottom wall of a fuel tank body, the collector body including fuel collecting chamber means and fuel passage means having an inlet adjacent to the bottom wall of the tank body and an outlet opening toward the fuel collecting chamber means for conducting fuel in the tank body into the fuel collecting chamber means.

The fuel passage means includes dam means at a portion between the inlet and outlet for preventing the fuel below a predetermined vertical level at the dam means from flowing out through the inlet.

The fuel collector unit further includes ejecting means for ejecting oversupplied return fuel into the fuel passage means through the inlet so as to suck the fuel therearound, the sucked fuel being mixed with the ejected return and introduced into the fuel passage means through the inlet.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings.

DESCRIPTION OF THE PREFERRED EMBODIMENT

A preferred embodiment of a fuel tank structure for an automotive vehicle according to the present invention will be described with reference to FIGS. 1 to 15.

Figure 1:
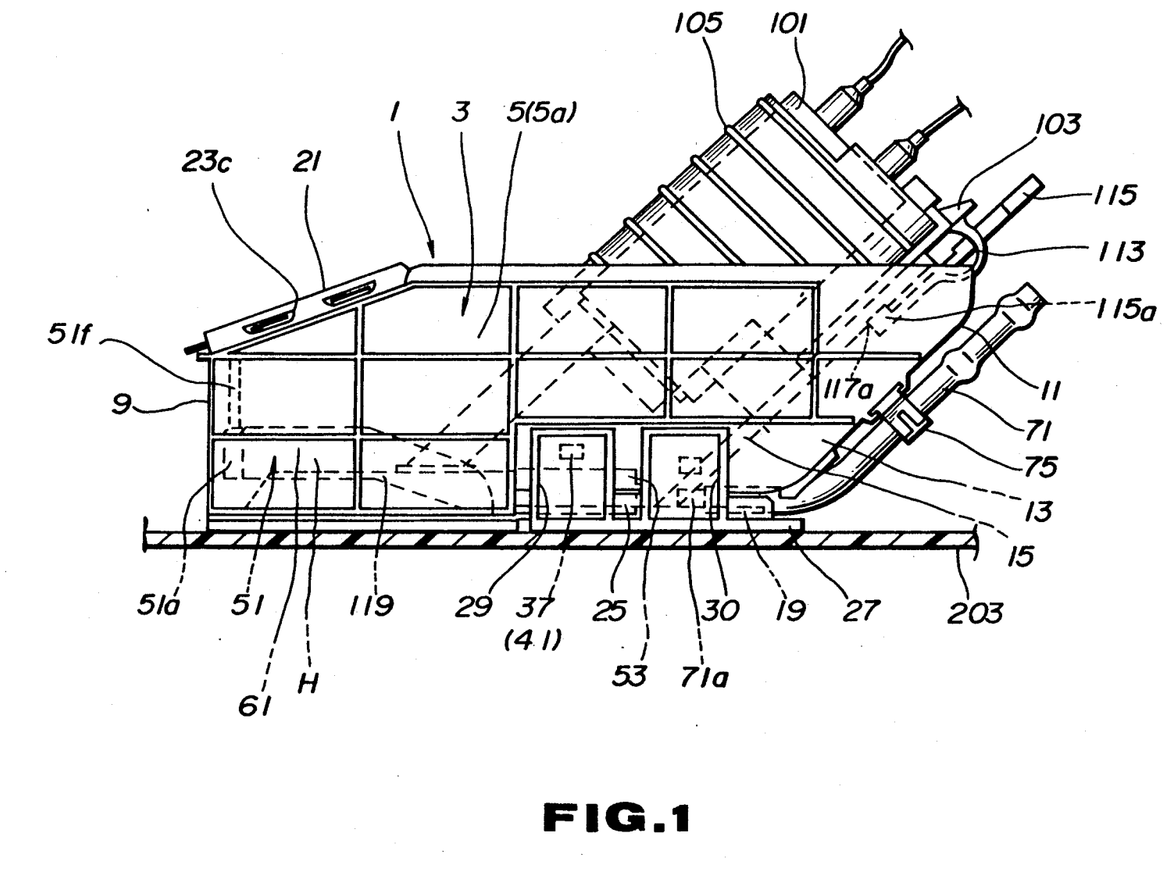
FIG. 1 is a side view showing a fuel colllector unit according to a preferred embodiment of the present invention.
Figure 2:
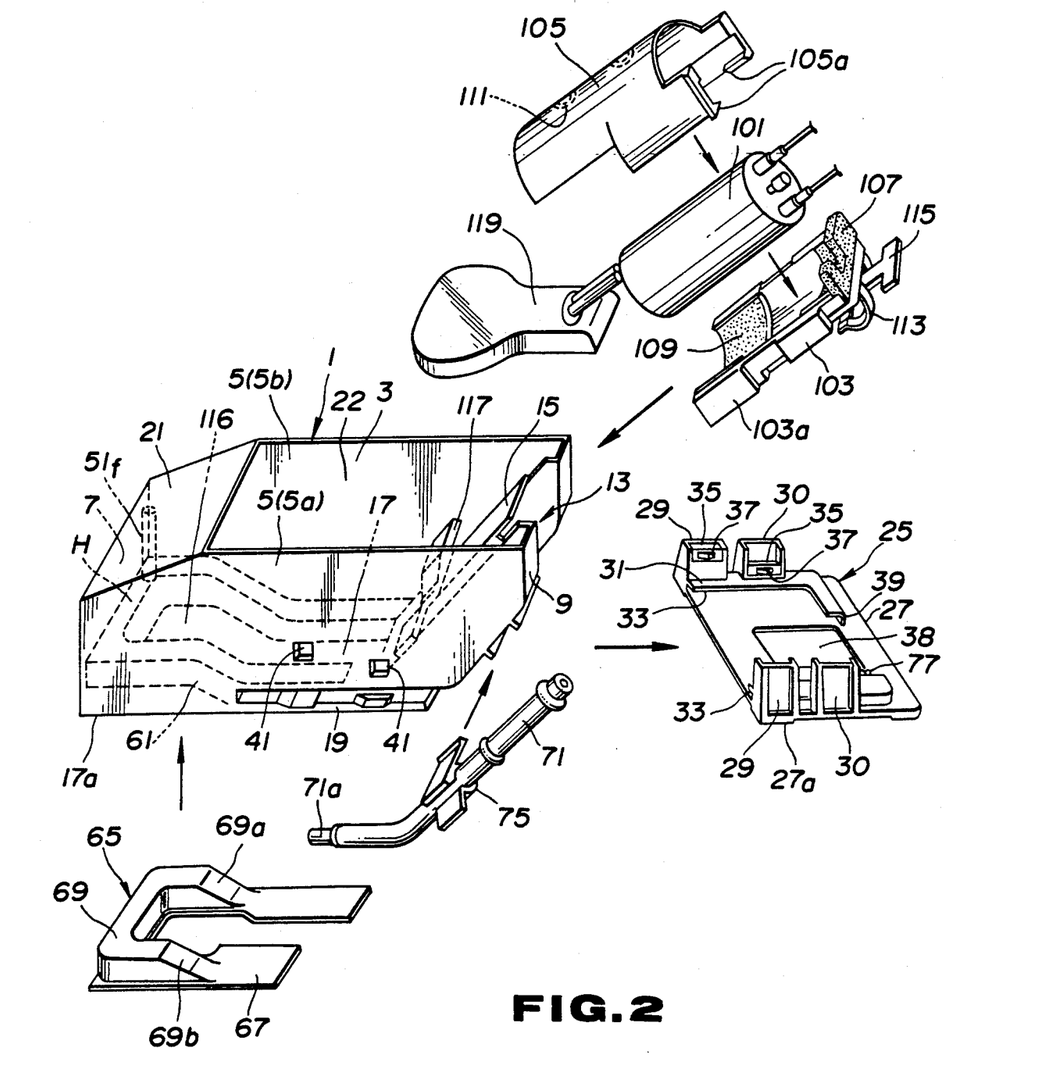
FIG. 2 is an exploded perspective view showing the fuel collector unit of FIG. 1.
Figure 3:
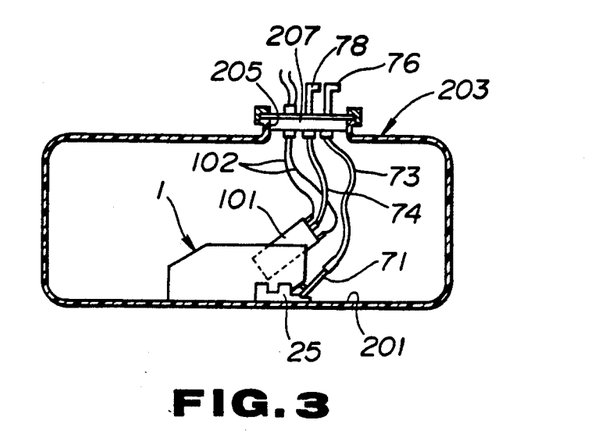
FIG. 3 is a schematic view for explaining an assembled condition of the fuel collector unit in a tank body.
Figure 7:
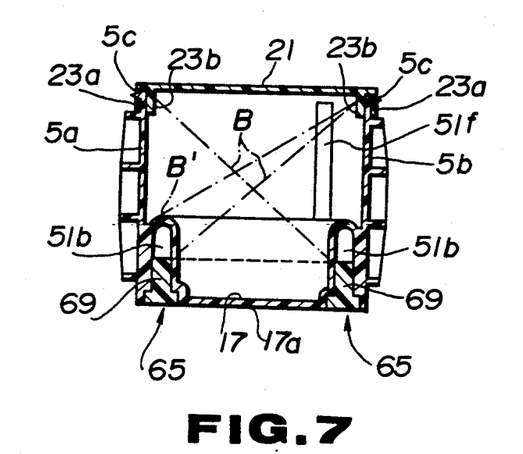
FIG. 7 is a sectional view taken along the line VII—VII of FIG. 6.

In FIGS. 1 to 3, a left side in the drawings denotes a front side of the vehicle (not shown). A fuel collector unit 1 includes a collector body 3 made of fiber reinforced plastics such as fiberglass included nylon. The collector body 3 is substantially of a long and narrow box shape for ease of insertion into a tank body 203 through a work window 205 provided at an upper wall of the tank body 203. The collector body 3 includes left and right side walls 5a and 5b, a front wall 9 and a rear wall 11. The rear wall 11 is slanted down forward except for its upper portion which is substantially vertical, and has a recessed portion 13 at its center portion along a width thereof. A mounting plate 15 forming a bottom of the recessed portion 13 is slanted substantially corresponding to the other slanted portion of the rear wall 11 and is continuous with a bottom wall 17 of the collector body 3 (see FIG. 2). The mounting plate 15 mounts an electromagnetic fuel feed pump 101 onto the collector body 3, which will be described later. At a lower end portion of the collector body 3, a mounting flange 19 is formed extending rearwardly from about a middle of the collector body 3 toward a vicinity of the lower end of the rear wall 11. The collector body further includes a slant upper end at its front end portion to which an upper cover plate 21 is mounted being slanted down forward for preventing fuel within a fuel collecting chamber 22 of the collector body 3 from flowing out forward at occurrence of, for example, a rapid braking of the vehicle. For this purpose, as shown in FIG. 7, the upper cover plate 21 is firmly fixed to the side walls 5a and 5b at its each side by means of a pair of rib members 23a and 23b which nips the corresponding side wall of the collector body 3. Further, engaging claws 5c projected from the side walls 5a and 5b are fitted into corresponding engaging holes 23c formed in the outer rib members 23a.

As shown in FIG. 2, the electromagnetic fuel feed pump 101 is assembled between a base 103 and a cover 105. The base 103 is provided at its inside with cushion rubbers 107 and 109, and the cover 105 is provided at its inside with cushion rubbers 111. The base 103 and the cover 105 are firmly fitted with each other by means of projections 105a so as to resiliently hold the fuel feed pump 101 therebetween. The base 103 is further provided with a pair of leaf springs 113 at its backside and with a latch lever 115 through the leaf springs 113 as clearly seen in FIG. 1. In this embodiment, the base 103, the leaf springs 113 and the latch lever 115 are formed integrally altogether. By moving down the base 103 with the fuel feed pump 101 and the cover 105 along a front surface of the mounting plate 15, a lower end portion 103a of the base 103 engages with a pair of ear-like projections 117 formed on the front surface of the mounting plate 15 so that the further downward displacement of the base 103 is prohibited. Simultaneously, a latch claw 115a formed at the lower end of the latch lever 115 is fitted into a latch hole 117a so as to complete a secure positioning of the base 103. At this position of the base 103, a suction strainer 119 is positioned in direct contact with the bottom 17 of the collector body 3 or just above the bottom 17.

As schematically illustrated in FIG. 3, the collector body 3 assembled with the above-mentioned other elements including the fuel feed pump 101, is mounted onto a bottom wall 201 of the tank body 203 through an adaptor unit 25. The adaptor unit 25 includes a base plate 27 which is welded to the tank bottom wall 201, and a pair of brackets 29 and 30 each side of the base plate 27. The adaptor unit 25 further includes a pair of substantially L-shaped rib plates 31 each extending inwardly some distance from the brackets 29 and 30 with a predetermined space 33 between the base plate 27 and the rib plate 31. Clips 35 are mounted in each pair of the brackets 29 and 30 at different vertical levels as seen in FIG. 2, and each clip 35 has a push-type claw 37 projecting aslant rearwardly. By inserting the mounting flange 19 of the collector body 3 into the space 33 formed between the base plate 27 and the L-shaped rib plates 31 from its front side so as to bring the mounting flange 19 into contact with a rear walls 39 of the L-shaped rib plates 31, the push-type claws 37 are respectively fitted into corresponding holes 41 formed in the side walls 5a and 5b of the collector body 3 so as to firmly mount the collector body 3 onto the tank bottom wall 201. Naturally, the holes 41 on each side wall are arranged at different vertical levels so as to match the locations of the corresponding push-type claws 37.

When some serious accident occurs, for example, the vehicle rides over a hard projection in the road so that the tank bottom wall projects upwardly, or a strong force is exerted on the fuel collector body 3 due to inertia force of the fuel feed pump and attacking force of the fuel at the time of a car crash, the push-type claws 37 are adapted to be broken to release the fuel collector body 3 along with the fuel feed pump 101. This arrangement works to prevent the tank body 203 from being damaged, so that leakage of the fuel is effectively avoided.

The base plate 27 further includes four projections 27a formed at its four corners, which are used for a welding purpose and are squashed by a welding pressure. Accordingly, a lower surface of the base plate 27 becomes substantially planar to be brought into close contact with the tank bottom wall 201.

In FIGS. 4 to 8, a fuel passage 51 is formed in the collector body 3. The fuel passage 51 is formed by making a portion of the bottom wall 17 larger in thickness, the portion corresponding to the fuel passage 51 to be formed, and further making a lower surface 17a of the bottom wall 17 recessed upward so as to form a groove 61. Accordingly, upper and both side walls of the fuel passage 51 are formed by inner surfaces of the groove 61, and a lower wall of the fuel passage 51 is formed by a plate 65 bonded to the lower surface 17a of the bottom wall 17. The groove 61 is substantially of a U-shape and has a larger depth at a side of the front wall 9.

Figure 4:
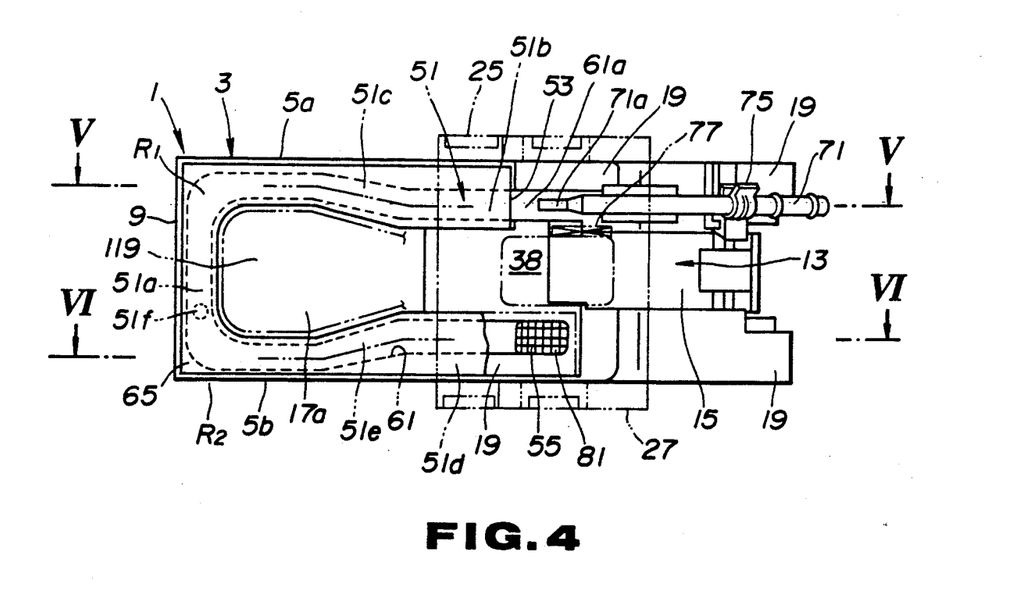
FIG. 4 is a bottom view partly broken showing the fuel collector unit.

As shown in FIG. 4, one end of the groove 61 is opened rearward at a location 61a which is communicated with a lower end portion of the recessed portion 13 of the rear wall 11. As shown in FIG. 2, the plate 65 includes a plate member 67 having a substantially U-shaped which corresponds to the shape of the groove 61, and an upward projecting portion 69 formed at a front side of the plate member 67, and slant portions 69a and 69b connecting the plate member 67 and the upward projecting portion 69.

In FIG. 4, the fuel passage 51 has an inlet 53 just forward of the location 61a, a first section 51a extending along the front wall 9, a second section 51b extending along the left side wall 5a between the inlet 53 and the first section 51a and a third section 51d extending rearwardly along the right side wall 5b from the first section 51a and opening upward into the fuel collecting chamber 22 at the vicinity of the rear wall 11, forming an outlet 55 of the fuel passage 51.

Figure 5:
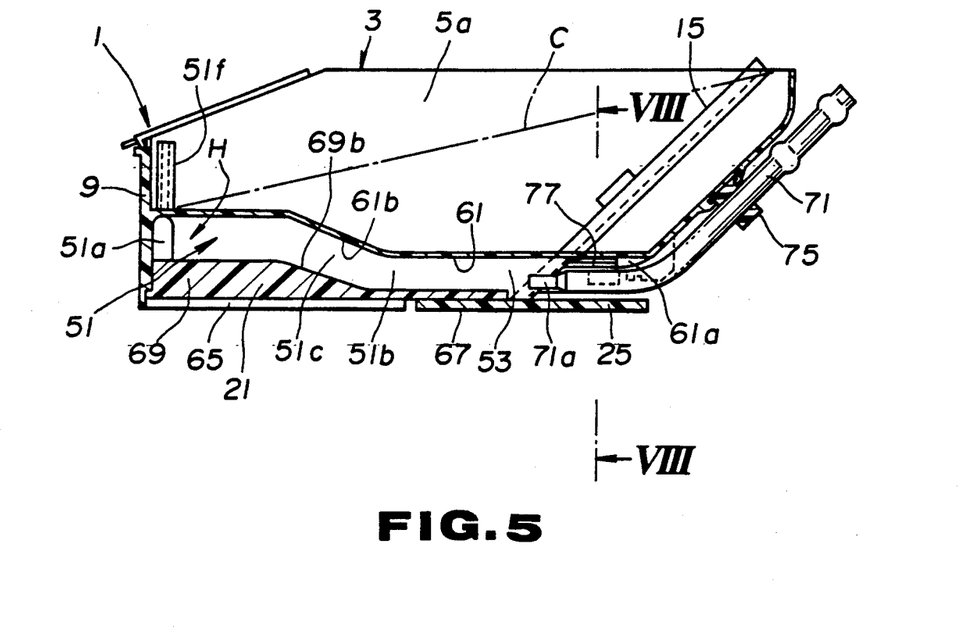
FIG. 5 is a sectional view taken along the line V—V of FIG. 4.

As seen in FIG. 5, the second section 51b of the fuel passage 51 has a rising portion 51c at its midway which is formed by the slant portion 69b of the plate 65 and a corresponding slant portion 61b of the groove 61. As shown in FIG. 4, the rising portion 51c rises forward approaching slantly to the left side wall 5a and further gradually reducing its width while gradually increasing its height, keeping its flow dimensions constant. This final shape in cross section of the rising portion 51c continues along the remaining portion of the second section 51b following the rising portion 51c. The first section 51a has the same shape in cross section as the final shape of the rising portion 51c except for its curved sections R1 and R2 connecting the second and third sections 51b and 51d, respectively. The first section 51a is positioned at the same vertical level H with the portion of the second section 51b having the final shape as mentioned above and remains at the same level along a length thereof. The third section 51d has a shape substantially symmetrical to the second section 51b. Specifically, the third section 51d includes a descending portion 51e formed by the slant portion 69a of the plate 65 and a corresponding slant portion 61a of the groove 61. The descending portion 51e descends rearward going slantly away from the right side wall 5b and further gradually increasing its width while gradually reducing its height, keeping its flow dimensions constant. This final shape in cross section of the descending portion 51e continues along the remaining portion of the third section 51d following the descending portion 51e.

It is to be noted that the reason for increasing the height and reducing the width of the portions of the flow passage 51 as described above is to position those portions of the fuel passsage 51 at a higher location as a whole, in addition to the location of the bottoms of those portions being higher than the other remaining portions of the fuel passage 51. Further, the curved sections R1 and R2 of the first section 51a are arranged to have a sufficiently large radius of curvature. This is also applied to bent portions of the second and third sections 51b and 51d defined by the rising and descending portions 51c and 51e. This structure is effective for preventing generation of vapor which is otherwise generated when the fuel flows at a high speed to generate swirls at those curved and bent portions having a small radius of curvature.

As shown in FIG. 5, a communication tube 51f is provided in the fuel collecting chamber 22 at its front end portion corresponding to the location of the first section 51a of the fuel passage 51. The communication tube 51f connects the first section 51a to the fuel collecting chamber 22 and works as a siphon such that even when a fuel level gets slant as indicated by a line C in FIG. 5 or a line B' in FIG. 7, the fuel within the fuel collecting chamber 22 is prevented from flowing out. The communication tube 51f should be placed sufficiently away from the inlet 53 of the fuel passage 51 so as not to impair a suction effect of the fuel, which will be described later. Further, the strainer 119 of the fuel feed pump 101 has a shape corresponding to a recessed bottom 116 defined by the projecting fuel passage 51 and is fitted therein so as to reduce an amount of the fuel to be remained in the tank body 203 as small a possible and to prevent a lateral dislocation of the strainer 119 due to, for example, vibrations of the vehicle.

A fuel return tube 71 is mounted to the rear wall 11 of the collector body 3 at its left side corresponding to the location of the inlet 53 of the fuel passage 51, by means of a clip 75 which is fitted into a corresponding socket member provided at the rear wall 11. The fuel return tube 71 extends forward at a lower portion thereof through its intermediate curved section. The forward extending lower portion of the fuel return tube 71 is placed at the location 61a with its tip portion being positioned just rearward of the inlet 53 and being directed toward the inlet 53 for introducing the returned fuel smoothly into the second section 51b of the fuel passage 51. In this embodiment, the tip portion is formed as a nozzle 71a for providing a jet flow of the returned fuel to generate vacuum therearound. Accordingly, the fuel around the jet flow is sucked by the vacuum and is introduced into the fuel passage 51 being mixed with the ejected returned fuel.

Figure 8:
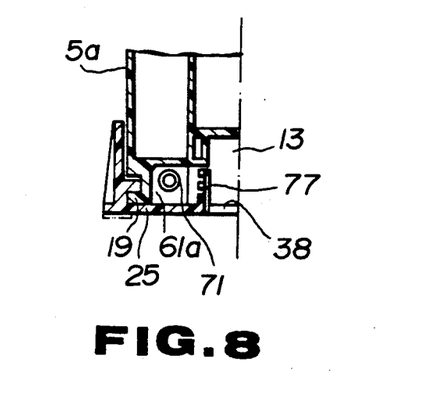
FIG. 8 is a sectional view taken along the line VIII—VIII of FIG. 5, but showing a portion thereof only.
Figure 9:
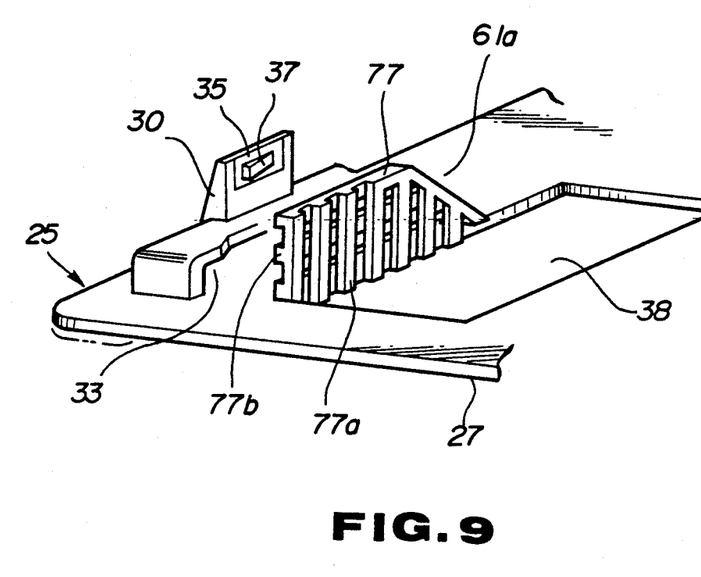
FIG. 9 is an enlarged view of FIG. 8, but showing a portion thereof only.

As described above, the location 61a is communicated with the recessed portion 13. Between the location 61a and the recessed portion 13, as shown in FIGS. 5 and 8, a meshed member 77 is provided. In FIG. 9, the meshed member 77 is shown enlarged. The meshed member 77 is fixedly and uprightly mounted on the base plate 27 of the adaptor 25. The meshed member 77 includes vertical elongate members 77a and horizontal elongate members 77b which are assembled back to back into a three-dimensional lattice form. Each of the vertical and horizontal elongate members has a square shape in cross-section. The base plate 27 is formed with an opening 38 adjacent to the meshed member 77. The meshed member 77 works to filter the sucked fuel so as to catch contaminants included in the fuel. Since the meshed member 77 is formed into the three-dimensional lattice form, i.e. the vertical and horizontal elongate members are assembled back to back, the mesh is not likely to be clogged with the included contaminants.

The meshed member 77 may be mounted onto the collector body 3.

Figure 6:
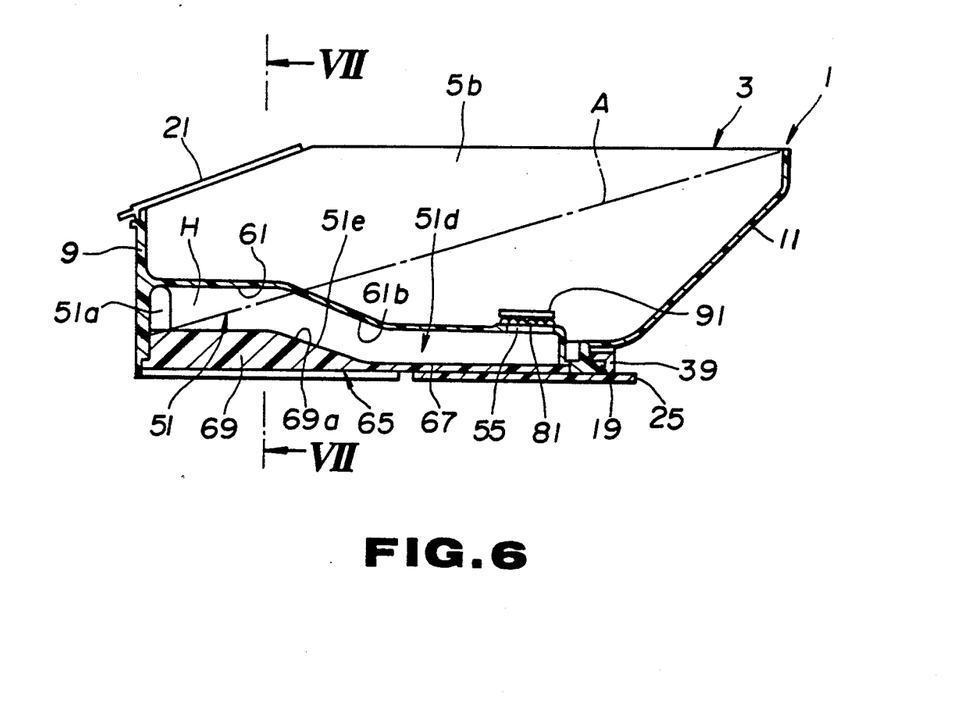
FIG. 6 is a sectional view taken along the line VI—VI of FIG. 4.
Figure 10:
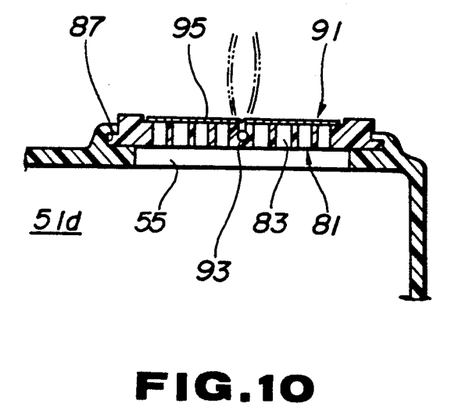
FIG. 10 is an enlarged sectional view of FIG. 6, but showing a portion thereof only.

As shown in FIGS. 4 and 6, the outlet 55 of the fuel passage 51 is provided with a meshed member 81. In FIG. 10, the meshed member 81 is shown enlarged. The meshed member 81 divides the fuel passage 51 into a number of flow passages 83 in a lattice form and is fitted into a groove 87 formed on inner peripheries of the outlet 55.

The meshed member 81 may be provided with a check valve 91 at its upper side in place of the communication tube 51f. The check valve 91 is formed of, for example, an elastic resin and has a central support member 93 and two thin valve plates 95 extending in opposite directions from the central support member 93. The check valve 91 is mounted onto the meshed member 81 with its central support member 93 firmly fitted into the central portion of the meshed member 81. The check valve 91 works to open the flow passages 83 with its valve plates 95 rising as shown by dotted lines in FIG. 10 when the fuel is introduced into the fuel collecting chamber 22 through the flow passages 83, as shown by solid lines in FIG. 10 when the fuel within the fuel collecting chamber 22 flows backward into the third section 51d of the fuel passage 51 through the flow passages 83.

Figure 11:
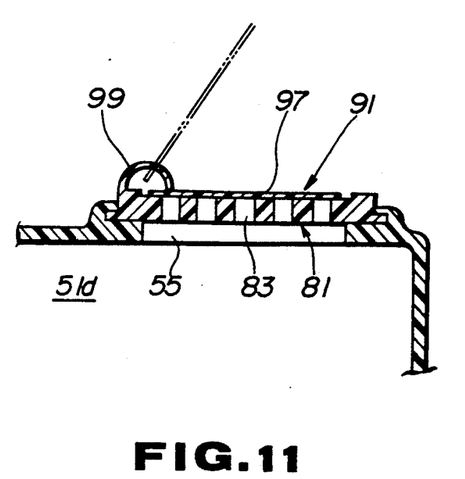
FIG. 11 is a sectional view showing a modification of the structure shown in FIG. 10.

FIG. 11 shows a modification of the check valve 91 shown in FIG. 10. In this modification, a valve plate 97 is continuous with the meshed member 81 through a leaf spring 99. This modified check valve 91 works in a manner similar to the check valve 91 of FIG. 10.

As shown in FIG. 3, the fuel return tube 71 and a fuel return pipe 76 are connected by a flexible fuel return hose 73, and the fuel feed pump 101 and a fuel feed pipe 78 are connected by a flexible fuel feed hose 74. The fuel return and feed pipes 76 and 78 as well as a lead 102 for the fuel feed pump 101 extend outside of the fuel tank body 203 through a cover plate 207 which closes the work window 205. By utilizing the flexible hoses 73 and 74, the connection between the fuel return pipe 76 and the fuel return tube 71 and between the fuel feed pipe 78 and the fuel feed pump 101 is maintained even after the fuel collector body is released from the adaptor 25, so that the vehicle can continue its travel.

Now the operation of the preferred embodiment will be described hereinbelow.

Assuming that the oversupplied return fuel is ejected as a jet flow from the tip, i.e, the nozzle in this embodiment, of the fuel return tube 71, the ejected jet flow is introduced into the second section 51b of the fuel passage 51. Since the vacuum is generated around the ejected jet flow to suck the fuel therearound, the fuel stored in the tank body 203 flows toward the location 61a. The sucked fuel is mixed into the ejected jet flow of the returned fuel and is introduced into the second 51b of the fuel passage 51, where the return fuel having an increased temperature is cooled by the sucked and mixed stored fuel. Naturally, since the above-described suction of the stored fuel is effective even when an amount of the fuel remained in the tank body 203 is very small, the fuel remained between the base plate 27 and the tank body bottom wall 201 is finally sucked through the opening 38 formed in the base plate 27. The meshed member 77 works to assist this final suction of the fuel.

It is to be noted that forming the tank body bottom wall precisely planar is very difficult particularly in case the tank body is formed by the blow moulding process. Accordingly, gaps are generated between the base plate 27 and the tank body bottom wall even after the adaptor 25 is welded to the tank body bottom wall, so that the fuel is likely to remain at these gaps.

The fuel introduced into the second section 51b of the fuel passage 51 flows into the third section 51d through the first section 51a. Since no angular portions exist along the length of the fuel passage 51 as described above, a flow resistance is set small and the generation of the vapor is effectively reduced.

Finally, the introduced fuel flows into the fuel collecting chamber 22 through the flow passages 83 of the meshed member 81 provided at the outlet 55. Since the fuel passage 51 is divided into a number of the flow passage 83, the effective cooling of the oversupplied return fuel is performed here again. Further, the flow energy is lowered by the divided flow passage 83, the fuel introduced into the fuel collecting chamber 22 is prevented from being directly dispersed out of the fuel collecting chamber 22. Still further, even if the vapor is generated in the introduced fuel, it is dispersed upward by the function of the meshed member 81.

Since the fuel is introduced into the collecting chamber 22 by utilizing the energy of the ejected jet flow, an extra amount of the fuel overflows from the fuel collecting chamber 22 so that a fuel level in the fuel collecting chamber 22 is always kept high.

As described above, the first section 51a of the fuel passage 51 is positioned at a higher location H relative to the inlet 53 so that the first section 51a works as a dam in the fuel passage 51. Accordingly, the maximum fuel capacity of the fuel collector body 3 when the fuel is biased toward one direction is defined by a dotted line A in FIG. 6 or by a dotted line B in FIG. 7, which is larger than the aforementioned conventional art wherein the maximum fuel capacity of the fuel collector body is determined by the vertical position of the inlet or outlet of the fuel passage. Further, the communication tube 51f or the check valve 91 effectively works to ensure the holding of the fuel in the fuel collecting chamber 22.

Still further, since the strainer 119 of the fuel feed pump 101 is disposed in a direct contact with or adjacent to the bottom wall 17 of the collector body 3, the suction of the fuel by the fuel feed pump 101 is performed at a vertical level of the tank body bottom wall 201. Accordingly, the amount of the fuel remained in the tank body is considerably reduced in cooperation with the effective suction of the fuel utilizing the ejected jet flow of the return fuel.

Figure 12:
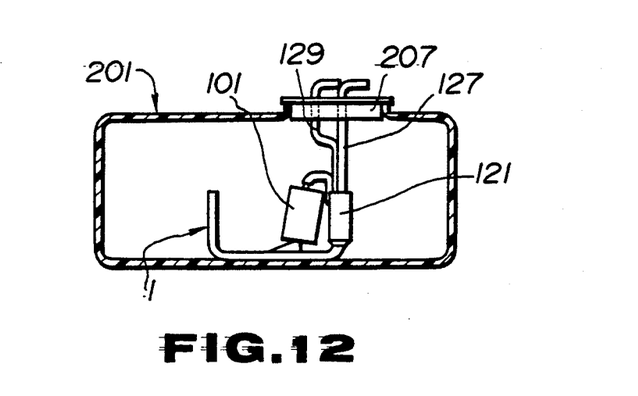
FIG. 12 is a schematic view of a modification of FIG. 3 showing an assembled condition of the fuel collector unit within the tank body.
Figure 13:
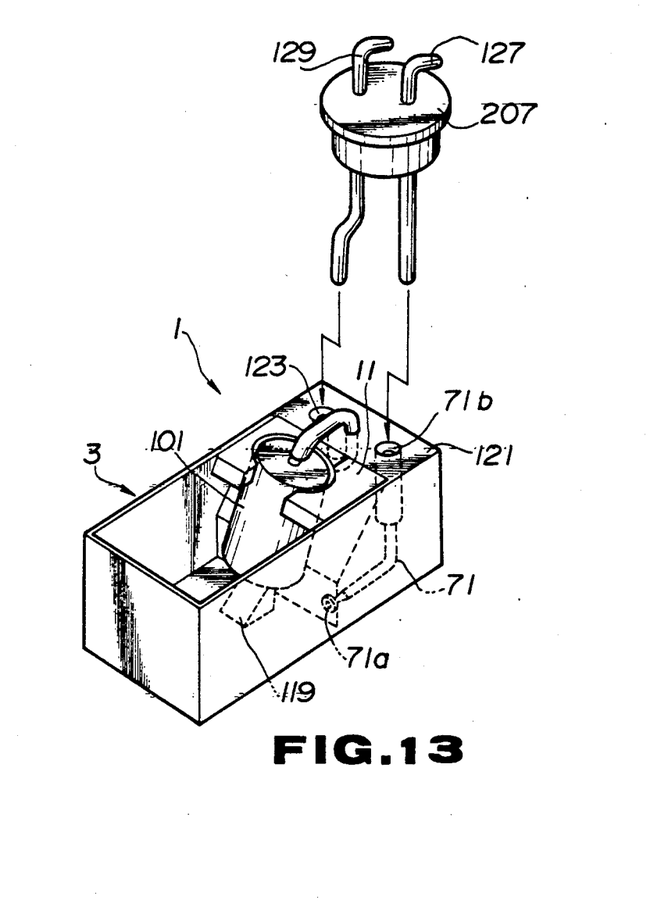
FIG. 13 is a perspective view showing a detailed structure of FIG. 12.
Figure 14:
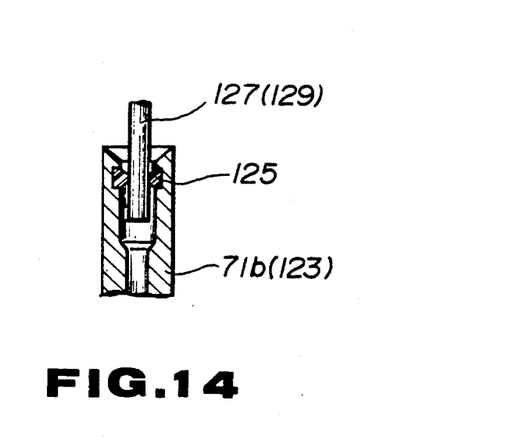
FIG. 14 is a sectional view of FIG. 13, but showing a portion thereof only.

FIGS. 12 to 14 show a modification of the structure shown in FIG. 3. Specifically, in this modification, the fuel collector body 3 has at the back side of the rear wall 11 an additional block 121 which is integrally formed with the other portions of the collector body 3. In the block 121, the fuel return tube 71 and its connection port 71b and a connection port 123 of the fuel feed pump 101 is formed. A detailed structure of the connection port 71b or 123 is shown in FIG. 14, wherein a O-ring 125 is provided on an inner periphery of the connection port 71b or 123 for a sealing purpose. A fuel return pipe 127 and a fuel feed pipe 129 extend downward through the cover plate 207 to be connected with the connection ports 71b and 123, respectively, as shown in FIG. 14. When assembling a pre-unit of the fuel collector body 3 and the fuel feed pump 101 is inserted through the work window 205 into the tank body 203 and is mounted onto the tank body bottom wall 201 directly or through the adaptor 25 as described above. Subsequently, other necessary parts are set in order and then the cover plate 207 is mounted to close the work window 205 such that the lower ends of the fuel returns pipe 127 and the fuel feed pipe 129 match with the corresponding connection ports 71b and 123, respectively. Accordingly, in comparison with the structure in FIG. 3, the number of the parts can be reduced, such as hoses and their connecting parts and the assembling process becomes easier and simpler. Further, the sealing at the connecting sections is highly ensured.

Figure 15:
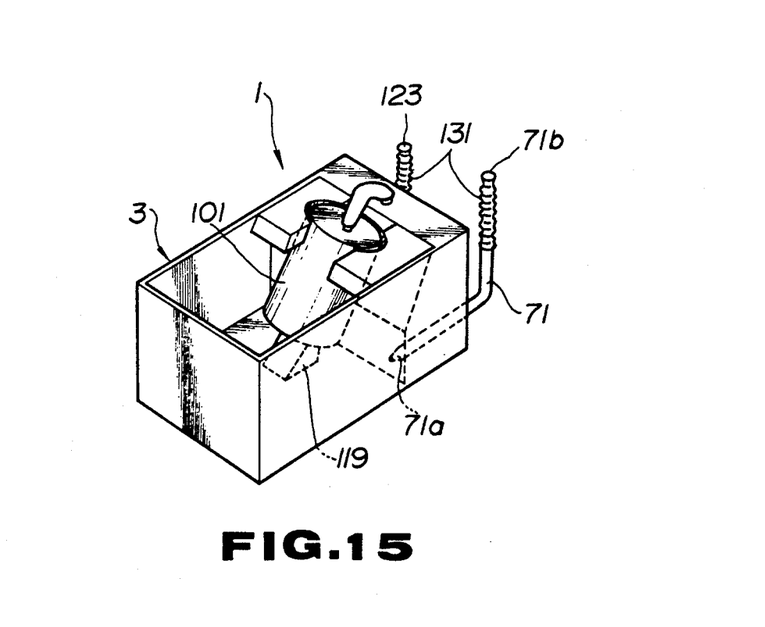
FIG. 15 is a perspective view showing a further modification of FIG. 3.

FIG. 15 shows another modification of the structure shown in FIG. 3. In this modification, the connection ports 71b and 123 each include a flexible section 131. Accordingly, dislocations between the fuel return pipe 127 and the connection port 71b and between the fuel feed pipe 129 and the connection port 123 are absorbed by the flexible section 131 so that the assembling becomes easier, and it is possible to keep their connections effective even after the fuel collector body 3 is released from the adaptor 25.

It is to be understood that the invention is not to be limited to the embodiment described above, and that various changes and modifications may be made without departing from the spirit and scope of the invention as defined in the appended claims.

What is claimed is:

1. In a fuel tank structure for an automotive vehicle, a fuel collector unit comprising:
   a fuel tank body;
   a collector body fixed relative to a bottom wall of said fuel tank body;
   said collector body including fuel collecting chamber means and fuel passage means having an inlet adjacent to the bottom wall of the tank body and an outlet opening toward said fuel collecting chamber means for conducting fuel in the tank body into said fuel collecting chamber means;
   said fuel passage means including a first passage extending from said inlet, a second passage extending from said outlet, and a third passage connecting said first and second passages, said third passage being positioned at the highest vertical level through a length of said first, second, and third passages, said first and second passages each having a slanted portion which connects said highest vertical level to a lower vertical level; and
   ejecting means for ejecting oversupplied return fuel into said first passage through said inlet so as to suck the fuel therearound, said sucked fuel being mixed with said ejected return fuel and being introduced into said first passage through said inlet to be conducted into said fuel collecting chamber means through said third passage, said second passage, and said outlet.

2. The fuel collector unit as set forth in claim 1, wherein said fuel passage means is formed just below said fuel collecting chamber means and said outlet is opened upward to communicate with said fuel collecting chamber means.

3. The fuel collector unit as set forth in claim 2, wherein said second passage is divided into a plurality of narrow passages at said outlet.

4. The fuel collector unit as set forth in claim 2, wherein said collector body includes a fron wall, a rear wall. side walls and a bottom wall, and werein said first passage extends substantially along one of said side walls, said second passage extends substantially along the other of said side walls, said third passage extends substantially along said front wall.

5. The fuel collector unit as set forth in claim 4, wherein said first, second and third passages are formed by upward recessed portions provided on a lower side of said bottom wall and cover means for closing said recessed portion.

6. The fuel collector unit as set forth in claim 5, wherein said cover means is a substantially U-shaped member corresponding to a shape of said recessed portion, said recessed portion having a larger depth in the vicinity of said front wall and said substantially U-shaped member having a larger thickness at its portion corresponding to the portion of said recessed portion having the larger depth.

7. The fuel collector unit as set forth in claim 4, wherein said slanted portion increases its height and reduces its width as it approaches said highest vertical level while maintaining its dimensions in cross section constant, and said third passage has the same shape in cross section with a shape of the portion of said slant portion having the finally increased height and finally reduced width.

8. The fuel collector unit as set forth in claim 4, wherein said collector body is mountend to the bottom wall of the tank body through a mounting plate which is fixed to the bottom wall of the tank body, said mounting plate having an opening therein for introducing the fuel existing between the bottom wall of the tank body and said mounting plate into the collector body.

9. The fuel collector unit as set forth in claim 4, wherein a fuel feed pump is mounted to said rear wall with a strainer thereof being placed in a direct contact with or adjacent to said bottom wall of the collector body.

10. The fuel collector unit at set forth in claim 5, wherein said recessed portion has upper and side walls projecting into said fuel collecting chamber means, and a fuel feed pump is mounted to said rear wall with its strainer being fitted into a space formed in said fuel collecting chamber means by said side wall of the recessed portion.

11. The fuel collector unit as set forth in claim 4, wherein a communication tube is provided in said fuel collecting chamber means sufficiently away from said inlet, said communication tube connecting the fuel collecting chamber means to said third passage for working as a siphon.

12. In a fuel tank structure for an automotive vehicle, a fuel collector unit comprising:
   a fuel tank body;
   a collector body fixed relative to a bottom wall of said fuel tank body,
   said collector body including a fuel collecting chamber and fuel passage means, formed just below said fuel collecting chamber and having an inlet adjacent to said bottom wall of said fuel tank body and an outlet opening upwards to communicate with said fuel collecting chamber, for conducting fuel in said fuel tank body into said fuel collecting chamber,
   said fuel passage means including dam means, located between said inlet and said outlet, for preventing fuel located below a predetermined vertical level which is higher than said inlet from flowing out through said inlet, said dam means comprising
   a first passage extending from said inlet,
   a second passage extending from said outlet, and a third passage connecting said first and second passage, said third passage being positioned at the highest vertical level through a length of said first, second, and third passage, said first and second passages each having a slanted portion which connects said highest vertical level to a lower vertical level; and ejecting means for ejecting oversupplied return fuel into said first passage through said inlet so as to suck the fuel therearound, said sucked fuel being mixed with said ejected return fuel and being introduced into said first passage trough said inlet to be conducted into said fuel collecting chamber trough said third passage, said second passage, and said outlet.

* * * * *